United States Patent [19]

Gregornik et al.

[11] 4,024,008
[45] May 17, 1977

[54] PLASTIC TO METAL BONDING METHOD

[75] Inventors: Norman W. Gregornik, Brooklyn Center; Dennis R. Pickering, Minneapolis, both of Minn.

[73] Assignee: Honeywell Inc., Minneapolis, Minn.

[22] Filed: Sept. 7, 1976

[21] Appl. No.: 720,537

[52] U.S. Cl. .................................. 156/272; 156/294
[51] Int. Cl.² .................. B29C 19/02; B29C 19/00
[58] Field of Search .................... 156/272, 294, 380

[56] References Cited
UNITED STATES PATENTS

| | | | |
|---|---|---|---|
| 3,695,970 | 10/1972 | Voss et al. | 56/272 |
| 3,788,928 | 1/1974 | Wise | 156/294 |

*Primary Examiner*—Douglas J. Drummond
*Attorney, Agent, or Firm*—Henry L. Hanson; John S. Munday; Roger W. Jensen

[57] ABSTRACT

A method of bonding thermoplastic resins to metals. A cylindrical portion of a metal is coated with an uncured adhesive. A quantity of a thermoplastic resin is molded onto the adhesive substantially uniformly about that portion of the metal having adhesive thereon, and a restraining ring is placed about the exterior portion of the thermoplastic resin such that the inner diameter of the restraining ring is substantially equal to the desired exterior diameter of the thermoplastic. The restraining ring is made from nonmetallic material. Induction heating is then performed on the metal for a time sufficient to cure the adhesive.

14 Claims, 2 Drawing Figures

PLASTIC TO METAL BONDING METHOD

BACKGROUND OF THE INVENTION

Induction heating of metals to cause the metal to raise the temperature of associated materials is well known and has been employed to cause the curing of adhesives and/or plastics associated with the metal. However, since plastics and metals are substantially dissimilar from each other in their chemical makeup, a proper bond between the plastic and metal is often times not easily achieved. While there are many applications where the strongest possible bond between plastics and metals would materially enhance the commercial utilization of such combinations of materials, one area which has particlarly strong needs for a good plastic-to-metal bond is the munitions industry.

In small caliber arms capable of rapid fire of many rounds in a short period of time, it is quite naturally desirable that the velocity of the projectile be maximized while the accuracy, primarily related to the spin thereof, of the projectile is additionally of prime importance. Normal manufacture of these types of arms includes the addition of rifling in the barrel of the arms and metallic bands on the projectile for the purpose of imparting spin to the fired projectile as it passes through the barrel.

Since these types of arms are intended to be fired rapidly and for long periods of time, it has not been possible to design a rifled barrel which can withstand the wear of many rounds of metal bands through the barrel in contact with the rifling. Further, as the velocity of the projectiles is increased, most common metallic bands will plate onto the inside of the barrel thereby decreasing performance. For that reason, plastic rotating bands have been provided on the rounds to engage the rifling without damage thereto and impart the spin to the projectile.

The projectile is subjected to significant acceleration upon firing, both in the axis of the direction of flight and in rotation due to the rifling. A strong bond between the rotating band and the projectile is of absolute importance if a satisfactory projectile is to be made.

DESCRIPTION OF THE PRIOR ART

A number of patents disclose the attempts which have been made to bond plastics to metal. U.S. Pat. No. 3,706,176 discloses a technique for capping a container utilizing a thermoplastic cap having an integral means for heating portions thereof by means of a high frequency magnetic field.

U.S. Pat. No. 3,808,074 discloses a method of induction heat sealing a sealing membrane to a container, wherein at least one of the container and the membrane is of a metallic material and the sealing is brought about through the intermediary of a thermoplastic material.

U.S. Pat. No. 3,503,823 describes a method in which adhesion of thermoplastic coatings to metal strip, wire and pipe is improved by extruding the coating material onto the metal and heat treating the interface between the coating and the metal at a temperature well above that at which the extrusion is done. The interface may be heated by induction methods, and the outer surface of the coating may be concurrently cooled.

U.S. Pat. No. 3,242,026 discloses a method wherein a glass structure or a laminated glass windshield is positioned so that the inside surface makes a firm and uniform contact with the upper surface of a plastic sheet of material. A bonding load is applied to the outside surface of the windshield and an induction heating coil is employed as one alternative for raising the temperature of the thermoplastic sheet material.

U.S. Pat. No. 3,439,620 discloses a projectile driving band comprising a radially laminated fibrous material such as woven asbestos cloth, or others, and a thermosetting resinous material of the phenol group of resins.

Finally, U.S. Pat. No. 3,838,479 discloses a method of attaching rotating bands to shell casings by braising.

OBJECTS OF THE INVENTION

Accordingly, it is an object of this invention to provide a method for bonding thermoplastic resins to metals.

Another object of this invention is to provide a method for bonding plastic rotating bands to projectiles.

Other objects will appear hereinafter.

DESCRIPTION OF THE INVENTION

The above and other objects of this invention may be accomplished by the present invention. Specifically, it has been discovered that thermoplastic resins may be bonded to metal to yield a highly superior bond by coating a cylindrical portion of the metal with an uncured adhesive, molding a quantity of thermoplastic onto the adhesive substantially uniformly about that portion of the metal, and restraining the molded thermoplastic with a nonmetallic restraining ring having an inner diameter substantially equal to the desired exterior diameter of the thermoplastic. Induction heating of the metal is then carried out for a time sufficient to cure the adhesive.

Metals useful for the method of this invention, to which plastic resins may be bonded, are those metals which are suitable for induction heating. Specifically, preferred metals include aluminum, iron, steel, copper, and alloys thereof.

Any of a wide variety of adhesives may be employed in the process of this invention. The thermoplastic adhesives such as polyurethanes, polyethylenes, polysulfones, polyamides, the hot melt blends including polyolefins and phenoxy adhesives are suitable thermoplastic adhesives for use in the process of this invention. Similarly, thermo-setting resins which have an adhesive quality may be employed in the present invention. Specifically, the epoxy resins, the phenolics and the polyurethanes are suitable thermo-setting adhesives for use in this invention.

Any thermoplastic resin may be used in the present invention and will be bonded to the metal chosen according to the process of this invention. The thermoplastic may be flexible or brittle, depending upon the ultimate use to which the article being manufactured will be put. Thermoplastic resins include polyamides (such as the many nylons), polyurethanes, polyethylenes and polypropylenes, polysulfones, and the polycarbonates. Elastomers may be employed such as natural or synthetic rubber, such as butyl rubber, as well as polychloroprene and polyisoprene. The thermoplastic material should be suitable for molding, and preferably injection molding onto the metal according to the method of this invention. The molding of thermoplastic resins onto various metal parts is a well known technique, and no departures from conventional technology are required for the practice of this invention.

The restraining ring may be selected from any material which is uneffected by induction heating. The function of the restraining ring is, as its name implies, to restrain the thermoplastic resin being bonded to the metal while the metal expands during induction heating. While it is true that a fragile restraining ring would fail under extreme stress if the metal were to be severely heated through induction heating, it is contemplated that the restraining ring will be strong enough to resist the expansion of the metal at temperatures necessary to affect a cure of the adhesive and a proper bond between the adhesive and the metal. Suitable materials from which a restraining ring may be made are the nonmetallic materials such as bakelite, melamine formaldehide resins and urea formaldehyde resins, glass, ceramics, concrete, dillaylphthalate resins and the like.

DESCRIPTION OF THE DRAWINGS

For a more complete understanding of the present invention, reference is hereby made to the drawings, in which:

As shown in FIG. 1, a projectile body 10 has been cut away so that the details of the attachment of a plastic rotating band to the projectile itself can be shown. A cylindrical portion 12 of the projectile is coated with a layer of adhesive 14 (shown greatly enlarged) and a quantity of thermoplastic resin 14 is injection molded onto the adhesive to give the desired shape of the plastic rotating band for the projectile. A restraining ring 18 is then placed around the thermoplastic resin such that the inner diameter of the nonmetallic restraining ring substantially equals the desired exterior diameter of the thermoplastic resin. Induction heating, such as through coils 20 is carried out for a sufficient time to effect a cure of the adhesive. Temperatures normally are sufficiently high to cause a partial melt of the thermoplastic resin, thereby intermingling the adhesive 14 with the edge of the thermoplastic 16 with which it is in contact.

EXAMPLES

Figure 1:
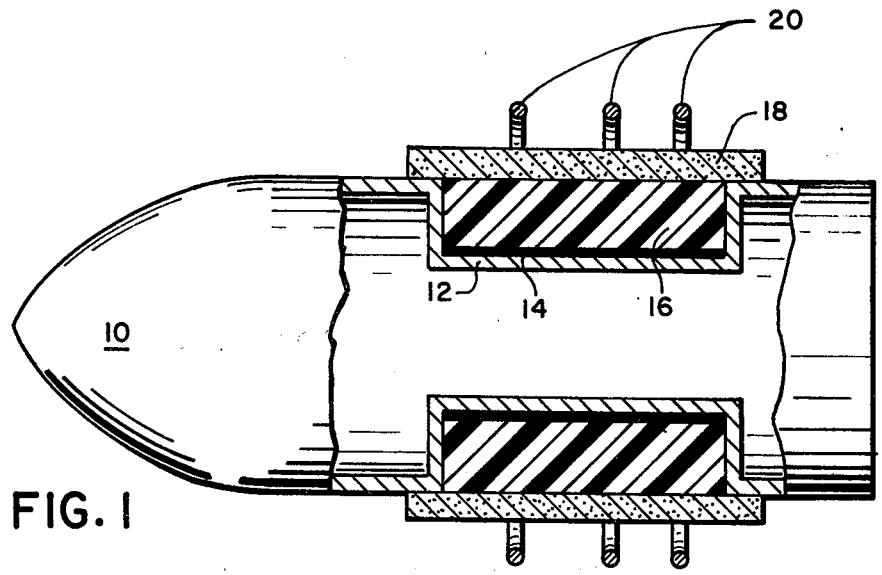
FIG. 1 shows a partially sectioned cut-away view of a preferred embodiment of this invention.
Figure 2:
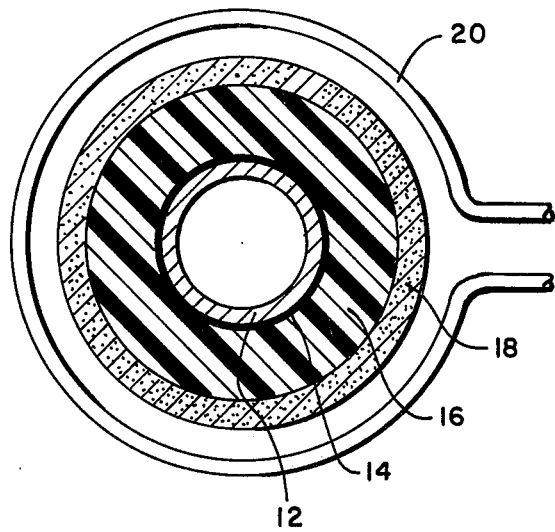
FIG. 2 shows a sectioned view taken through the middle of the device shown in FIG. 1.

A number of experiments are performed to demonstrate the efficiency of the present invention and to more clearly explain the preferred embodiment. Specifically, a number of projectiles were prepared and fired at various speeds to measure the retention of the rotating band and evaluate the projectile yaw.

Two groups of projectiles were prepared. In the first group, representing those manufactured according to the present invention, a projectile similar to that shown in the drawings was prepared from a steel normally used in projectile manufacturing. A thermo-setting epoxy resin was then coated onto that portion of the projectile to which the rotating band is to be attached. A nylon 12 (polyamide) plastic rotating band was then injection molded onto the projectile in the shape desired for use of the projectile. A bakelite ring was then inserted on the projectile such that the inner diameter of the bakelite ring substantially equalled the desired exterior diameter of the thermoplastic nylon. The projectile was then subjected to an induction heating process for sufficient time to cure the thermo-setting epoxy resin adhesive. A second group of projectiles were prepared using the foregoing method without the presence of the bakelite ring. In other words, the same steel projectiles were coated with the same resin in the same amount, followed by injection molding of the same nylon plastic rotating band so that the projectiles, from an exterior appearance, appeared identical to the first batch. The thermosetting epoxy resin adhesive was again cured by induction heating, but, as it has been stated, no restraining ring was employed during the cure state. A visual inspection of the projectiles failed to disclose any difference.

However, the projectiles were assembled with cartridge cases having various propellant loads in them to vary the velocity of the projectile upon firing through a rifled barrel. Through high speed photography, pictures were taken of the projectile down range. The sample of projectiles fired was sufficient to give a statistically reliable report on the percentage of projectiles which retained their plastic rotating band. The number of projectiles fired and photographed was also sufficient to give a statistically accurate percentage for measuring the projectile yaw, or determination of how well the projectile spun.

Presented below in the table are the results of these tests. As can be seen clearly, the projectiles manufactured using the method of this invention were substantially superior to those prepared without all of the steps of the method described herein.

TABLE

|  |  | speed (ft./sec) | % retention | yaw (degrees) |
|---|---|---|---|---|
| FIRST GROUP (the invention) | IA | 3800 | 100 | 0 |
|  | IB | 3873 | 100 | 0 |
|  | IC | 4057 | 0 | 15 |
| SECOND GROUP | IIA | 3852 | 85 | 0 |
|  | IIB | 3865 | 0 | 45 |
|  | IIC | 4040 | 0 | 50 |

The embodiments of the invention in which an exclusive property or right is claimed are defined as follows:

1. A method of bonding thermoplastic resins to metal, comprising:
   coating a cylindrical portion of a metal with an uncured adhesive;
   molding a quantity of a thermoplastic resin onto said adhesive substantially uniformally about the portion of said metal;
   restraining said molded thermoplastic with a nonmetallic restraining ring having an inside diameter substantially equal to the desired exterior diameter of said thermoplastic resin; and
   induction heating said metal for a time sufficient to cure said adhesive.

2. A method of claim 1 wherein said metal is selected from the group consisting of aluminum, iron, steel, copper and alloys thereof.

3. The method of claim 1 wherein said adhesive is a thermoplastic adhesive selected from the group consisting of polyurethanes, polyethylenes, polyamides, polysulfones, phenoxy adhesives, and polyolefines.

4. The method of claim 1 wherein said adhesive is a thermo-setting resin selected from the group consisting of epoxy, phenolic and polyruethane adhesives.

5. The method of claim 1 wherein said thermoplastic resin is injection molded onto said adhesive and comprises a resin selected from the group consisting of polyurethanes, polyethylenes, polypropylenes, polyamides, polyolefines and polysulfones.

6. The method of claim 1 wherein said thermoplastic resin is selected from the group of natural rubber, synthetic rubber, butyl rubber polychloroprene and polyisoprene.

7. The method of claim 1 wherein said restraining ring is selected from the group consisting of bakelite, glass, ceramic material, concrete, melamine, formaldehyde resins and urea formaldehyde resins.

8. A method of mounting a thermoplastic rotating band on a metal projectile, comprising:
   coating a cylindrical portion of a projectile with an uncured adhesive;
   molding a sufficient quantity of thermoplastic resin on said adhesive to form a rotating band;
   restraining said band with a nonmetallic restraining ring having an inner diameter substantially equal to the desired exterior diameter of the rotating band;
   induction heating said projectile for a time sufficient to bond said thermoplastic to said projectile by curing said adhesive; and
   cooling said projectile to permit removal of said restraining ring.

9. A method of claim 8 wherein said metal is selected from the group consisting of aluminum, iron, steel, copper and alloys thereof.

10. The method of claim 8 wherein said adhesive is a thermoplastic adhesive selected from the group consisting of polyurethanes, polyethylenes, polyamides, polysulfones, phenoxy adhesives and polyolefines.

11. The method of claim 8 wherein said adhesive is a thermo-setting resin selected from the group consisting of epoxy, phenolic and polyurethane adhesives.

12. The method of claim 8 wherein said thermoplastic resin is injection molded onto said adhesive and comprises a resin selected from the group consisting of polyurethanes, polyethylenes, polypropylenes, polyamides, polyolefines and polysulfones.

13. The method of claim 8 wherein said thermoplastic resin is selected from the group of natural rubber, synthetic rubber, butyl rubber, polychloroprene and polyisoprene.

14. The method of claim 8 wherein said restraining ring is selected from the group consisting of bakelite, glass, ceramic material, concrete, melamine, formaldehyde resins and urea formaldehyde resins.

* * * * *